United States Patent [19]

Okada et al.

[11] Patent Number: 5,537,129
[45] Date of Patent: Jul. 16, 1996

[54] COMMON ELECTRODE DRIVING CIRCUIT FOR USE IN A DISPLAY APPARATUS

[75] Inventors: Hisao Okada, Nara-ken; Tadatsugu Nishitani, Amagasaki; Yuji Yamamoto, Kobe; Takeshi Takarada, Tenri, all of Japan

[73] Assignee: Sharp Kabushiki Kaisha, Osaka, Japan

[21] Appl. No.: 178,387

[22] Filed: Dec. 23, 1993

[30] Foreign Application Priority Data

Dec. 28, 1992 [JP] Japan ..................................... 4-349405

[51] Int. Cl.$^6$ ..................................................... G09G 3/36
[52] U.S. Cl. ................................................ 345/90; 345/94
[58] Field of Search ................................. 345/87, 94, 95, 345/208, 210, 63, 77, 89, 90–93; 359/55, 57, 84, 85

[56] References Cited

U.S. PATENT DOCUMENTS

| 5,057,928 | 10/1991 | Nagashima et al. | 345/208 |
| 5,283,477 | 2/1994 | Shibata | 307/264 |
| 5,353,135 | 10/1994 | Edwards | 345/87 |

FOREIGN PATENT DOCUMENTS

| 0428250A2 | 5/1991 | European Pat. Off. . |
| 0455204A2 | 11/1991 | European Pat. Off. . |
| 4022923 | 1/1992 | Japan . |
| 4-191821 | 7/1992 | Japan . |

OTHER PUBLICATIONS

S. Tomita et al., Conference Record of the 1991 International Display Research Conference, pp. 235–238; published Oct. 15, 1991 "A Compensative Driving Method For Common Electrode Voltage Distortions in TFT–LCDs".

*Primary Examiner*—Jeffery Brier
*Attorney, Agent, or Firm*—David G. Conlin; Kevin J. Fournier

[57] ABSTRACT

A common electrode driving circuit for use in a display apparatus including a first substrate; a second substrate opposed to the first substrate with a display medium interposed therebetween; a plurality of pixel electrodes, a plurality of common electrode driving terminals provided on a surface of the first substrate opposed to the second substrate; and at least one common electrode provided on a surface of the second substrate opposed to the first substrate. The common electrode is opposed to the plurality of pixel electrodes and is connected to the plurality of common electrode driving terminals respectively through a plurality of common electrode transfer resistances. The common electrode driving circuit includes a detection device for detecting a resultant voltage applied to the common electrode through at least one of the plurality of common electrode transfer resistances; and a driving voltage generating circuit for generating a driving voltage based on a reference signal and a resultant voltage applied to the common electrode which is detected by the detection device and outputting the driving voltage to the plurality of common electrode driving terminals.

4 Claims, 6 Drawing Sheets

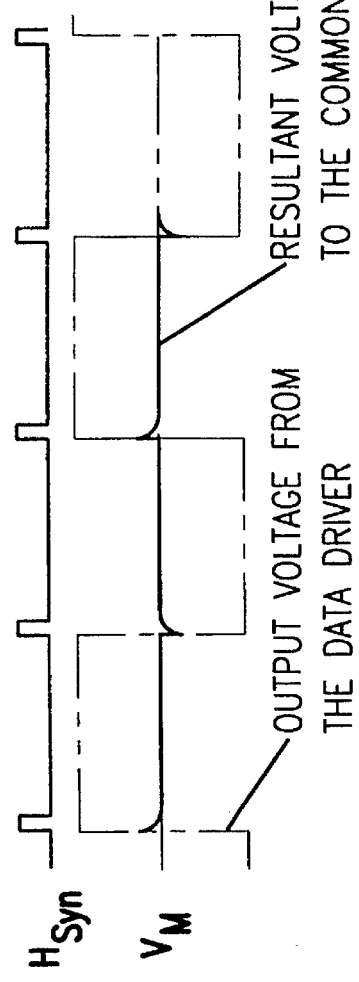
FIG.3(a)
FIG.3(b)
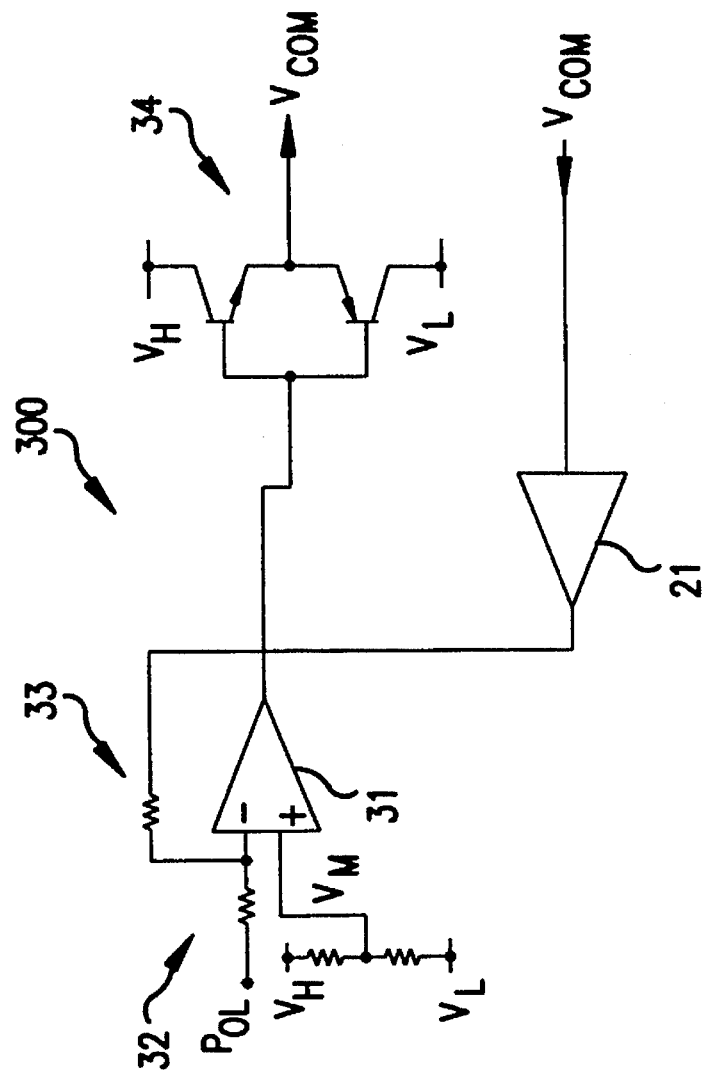
FIG.4

IDEAL VOLTAGE FOR THE COMMON ELECTRODE

RESULTANT VOLTAGE APPLIED TO THE COMMON ELECTRODE

OUTPUT VOLTAGE FROM THE DATA DRIVER

RESULTANT VOLTAGE APPLIED TO THE COMMON ELECTRODE

OUTPUT VOLTAGE FROM THE DATA DRIVER $H_{Syn}$ $P_{OL}$ $V_M$

OUTPUT VOLTAGE FROM THE DATA DRIVER
RESULTANT VOLTAGE APPLIED TO THE COMMON ELECTRODE
IDEAL VOLTAGE FOR THE COMMON ELECTRODE

OUTPUT VOLTAGE FROM THE DATA DRIVER
RESULTANT VOLTAGE APPLIED TO THE COMMON ELECTRODE
$V_M$
IDEAL VOLTAGE FOR THE COMMON ELECTRODE

COMMON ELECTRODE DRIVING CIRCUIT FOR USE IN A DISPLAY APPARATUS

BACKGROUND OF THE INVENTION

1. Field of the Invention

The present invention relates to a common electrode driving circuit for use in a display apparatus such as an active matrix liquid crystal display apparatus, and in particular to a common electrode driving circuit for use in a display apparatus provided with a common electrode opposed to a plurality of pixel electrodes or a common electrode opposed to all of a plurality of pixels provided in the display apparatus.

2. Description of the Related Art

Briefly referring to FIG. 6, an active matrix liquid crystal display apparatus generally includes a first substrate 1, a second substrate 2 opposed to the first substrate 1 and a liquid crystal layer (not shown) as a display medium interposed between the first substrate 1 and the second substrate 2. The first substrate 1 has a plurality of pixel electrodes, data lines, gate lines and the other elements (not shown) disposed on a surface thereof opposed to the second substrate 2. The second substrate 2 has at least one common electrode (not shown) on a surface thereof opposed to the first substrate 1. The common electrode is connected to common electrode driving terminals 4a and 4b provided on the first substrate 1 through common electrode transfer resistances 3a and 3b provided between the first and the second substrates 1 and 2. The common electrode is connected to the first substrate 1 in order to drive the common electrode using the common electrode driving circuit provided on the first substrate 1.

Common electrode driving circuits are generally classified into two types: the one using a DC voltage and the one using an AC voltage.

FIG. 7 illustrates a conventional common electrode driving circuit 15 using a DC voltage. The common electrode driving circuit 15 is provided with a complementary circuit 10. The complementary circuit 10 supplies a current to a common electrode or absorbs a current from the common electrode so as to maintain the voltage $V_{COM}$ of the common electrode at a specified level, which is determined by the voltages $V_H$ and $V_L$ ($V_H > V_L$).

FIG. 8 illustrates a conventional common electrode driving circuit 16 using an AC voltage. The common electrode driving circuit 16 is provided with an operational amplifier 11 and a complementary circuit 12. The operational amplifier 11 amplifies a $P_{OL}$ signal having a square waveform inputted to an inversion input terminal thereof and sends an amplified AC signal to the complementary circuit 12. The complementary circuit 12 supplies a current to a common electrode or absorbs a current from the common electrode in response to the AC signal inputted thereto. In the common electrode driving circuit 16, a voltage applied to the common electrode is fedback to the inversion input terminal of the operational amplifier 11 in order to allow an output voltage from the complementary circuit 12 to have the same ideal square waveform and the same phase with those of the $P_{OL}$ signal inputted to the inversion input terminal. FIGS. 9(a) and 9(b) illustrate waveforms concerning an output voltage from a common electrode driving circuit using an AC voltage for use in an active matrix liquid crystal display apparatus. FIG. 9(a) illustrates a waveform of a horizontal synchronous signal; and FIG. 9(b) illustrates an ideal waveform of the output voltage (indicated by the solid line) for performing AC driving using a square wave which has a voltage $V_M$ (indicated by the one-dot chain line) as the central voltage level thereof.

The conventional common electrode driving circuits have the following problems:

In an active matrix liquid crystal display apparatus, a data signal is outputted to all data lines in every horizontal period to turn "ON" pixels connected to the gate lines which are ON at that time. Each of the pixels includes a pixel electrode and a common electrode opposed to the pixel electrode and thus acts as a capacitor. Due to such a structure, the resultant voltage $V_{COM}$ applied to the common electrode is influenced by the output voltage from the data driver to the data line, namely, the voltage applied to the pixel electrode, and thus is changed from a specified level. The degree of the voltage change of the common electrode depends on the level of the output voltage from the data driver. In a conventional common electrode driving circuit, the pixel electrode which is a part of the capacitor and the common electrode transfer resistance 3a (FIG. 6) are connected in series. Accordingly, even if a voltage having an ideal waveform is inputted to the common electrode driving terminal 4a, the waveform of the resultant voltage $V_{COM}$ applied to the common electrode is changed from the ideal waveform.

FIGS. 10(a) to 10(c) illustrate signal waveforms obtained by the conventional common electrode driving circuit 15 shown in FIG. 7. The solid line indicates a resultant voltage $V_{COM}$ applied to the common electrode; the two-dot chain line indicates an output voltage from the data driver; and the one-dot chain line indicates the central voltage and corresponds to an ideal voltage applied to the common electrode. FIG. 10(a) illustrates a waveform of a horizontal synchronous signal; FIG. 10(b) illustrates the waveforms obtained when absolute values of output voltages from the data driver to all the data lines are maximum; and FIG. 10(c) illustrates the waveforms obtained when absolute values of output voltages from the data driver to all the data lines are minimum. As is apparent from FIGS. 10(b) and 10(c), when the absolute values of the output voltages from the data driver to all the data lines are maximum, the resultant voltage $V_{COM}$ applied to the common electrode is greatly influenced by the level of the output voltages from the data driver. By contrast, when the absolute values of the output voltages from the data driver to all the data lines are minimum, the resultant voltage $V_{COM}$ applied to the common electrode is influenced only slightly by the level of the output voltages from the data driver.

FIGS. 11(a) to 11(d) illustrate signal waveforms obtained by the conventional common electrode driving circuit 16 shown in FIG. 8. The solid line indicates a resultant voltage $V_{COM}$ applied to the common electrode; the two-dot chain line indicates an output voltage from the data driver; the one-dot chain line indicates the central voltage $V_M$; and the dashed line indicates an ideal waveform for the voltage $V_{COM}$ applied to the common electrode. FIG. 11(a) illustrates a waveform of a horizontal synchronous signal; FIG. 11(b) illustrates a square waveforms of the $P_{OL}$ signal as a reference signal; FIG. 11(c) illustrates the waveforms obtained when absolute values of output voltages from the data driver to all the data lines are maximum; and FIG. 11(d) illustrates the waveforms obtained when absolute values of output voltages from the data driver to all the data lines are minimum. As is apparent from FIGS. 11(c) and 11(d), when the absolute values of the output voltages from the data driver to all the data lines are maximum, the resultant voltage $V_{COM}$ applied to the common electrode is greatly influenced by the level of the output voltages from the data driver. By contrast, when the absolute values of the output voltages from the data driver to all the data lines are minimum, the resultant voltage $V_{COM}$ applied to the common electrode is influenced only slightly by the level of the output voltages from the data driver.

The voltage applied to the pixel (hereinafter, referred to as the "pixel voltage") corresponds to a difference between a voltage applied to the pixel electrode and a resultant voltage $V_{COM}$ applied to the common electrode. Accordingly, even if the voltage of the data signal outputted from the data driver is kept at a specified level, the pixel voltage changes in correspondence with the voltage $V_{COM}$ applied to the common electrode when the capacitor composed of the picture electrode and the common electrode is charged. In other words, even if the data signal maintains the same level of voltage, the image displayed by the liquid crystal display apparatus is changed in the tone. For example, assuming that there are 1620 data lines in all, when the output voltages to 810 data lines among the 1620 are maximum and output voltages to the remaining 810 are minimum, the resultant voltage $V_{COM}$ applied to the common electrode is more influenced by the output voltage from the data driver than when output voltages to all the 1620 data lines are minimum. As a result, the pixel voltage is lower in the former case than the latter case. If the difference in the tone of the displayed image caused by such a low pixel voltage is visually recognized, such a phenomenon is recognized as "shadowing".

FIG. 12 illustrates an example of shadowing. The liquid crystal display apparatus shown in FIG. 12 is in a so-called "normally white" mode. A black image is displayed when the pixel voltage is maximum, and a white image is displayed when the pixel voltage is minimum. Shadowing hardly occurs when the pixel voltage is in the vicinity of the maximum level or in the vicinity of the minimum level. This is due to the electrooptical characteristics of the liquid crystal display; namely, the liquid crystal display shows a small change in the transmittance in response to the pixel voltage when the pixel voltage is in the vicinity of the maximum or the minimum level. When the pixel voltage is in such a range as to display an image having halftones, the transmittance of the liquid crystal display greatly changes due to a small change in the voltage, thus easily causing shadowing.

In a display screen shown in FIG. 12, three areas A, B and C corresponding to different common electrodes from one another are arranged vertically. For example, when the display apparatus is operated so that the whole areas of A and C, and two end portions of area B will have tone a and the central portion of area B will have tone c, the two end portions of area B are influenced by the central portion of area B having tone c. As a result, the two end portions of area B obtain tone $b$ which is between tones a and c instead of the tone a. In this manner, a desirable tone cannot be obtained.

SUMMARY OF THE INVENTION

A common electrode driving circuit according to the present invention is for use in a display apparatus including a first substrate; a second substrate opposed to the first substrate; a display medium interposed between the first substrate and the second substrate; a plurality of pixel electrodes, a plurality of common electrode driving terminals provided on a surface of the first substrate opposed to the second substrate; and at least one common electrode provided on a surface of the second substrate opposed to the first substrate. The common electrode is opposed to the plurality of pixel electrodes and is connected to the plurality of common electrode driving terminals respectively through a plurality of common electrode transfer resistances. The common electrode driving circuit includes a detection device for detecting a resultant voltage applied to the common electrode through at least one of the plurality of common electrode transfer resistances; and a driving voltage generating circuit for generating a driving voltage based on a reference signal and the resultant voltage applied to the common electrode which is detected by the detection device and outputting the driving voltage to the plurality of common electrode driving terminals.

In one embodiment of the invention, the driving voltage is a DC voltage.

In one embodiment of the invention, the driving voltage is an AC voltage.

In one embodiment of the invention, the detection device includes a high input impedance element.

In a common electrode driving circuit according to the present invention, even if an output voltage to data lines has an influence to change a voltage applied to a common electrode, such a change is compensated for by a driving voltage generating circuit based on the voltage detected by a detection device. Thus, the voltage applied to the common electrode can be maintained at a specified level.

Further, a high input impedance element is used for the detection device, the detection device can detect the voltage applied to the common electrode with high accuracy.

Thus, the invention described herein makes possible the advantages of providing a common electrode driving circuit for use in a display apparatus realizing high quality images with no shadowing.

These and other advantages of the present invention will become apparent to those skilled in the art upon reading and understanding the following detailed description with reference to the accompanying figures.

BRIEF DESCRIPTION OF THE DRAWINGS

FIGS. 3(a) and 3(b) illustrate signal waveforms obtained by the common electrode driving circuit shown in FIG. 1.

FIG. 4 is a circuit diagram of a common electrode driving circuit according to the present invention using an AC voltage.

DESCRIPTION OF THE PREFERRED EMBODIMENTS

Hereinafter, the present invention will be described by way of illustrative examples with reference to the accompanying drawings.

Figure 6:
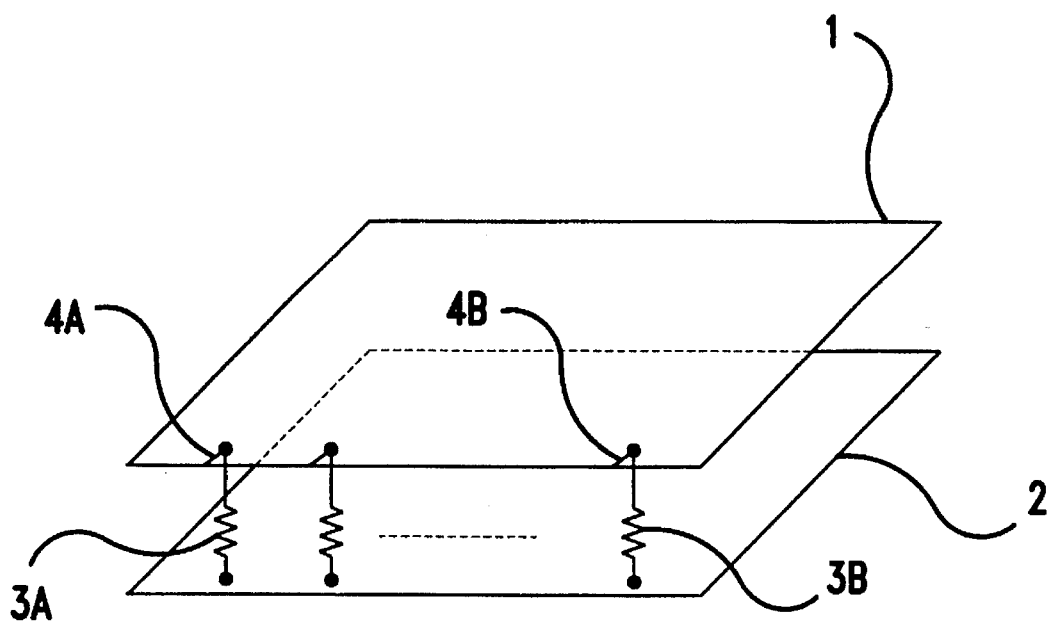
FIG. 6 is a schematic isometric view of a liquid crystal display apparatus.
Figure 7:
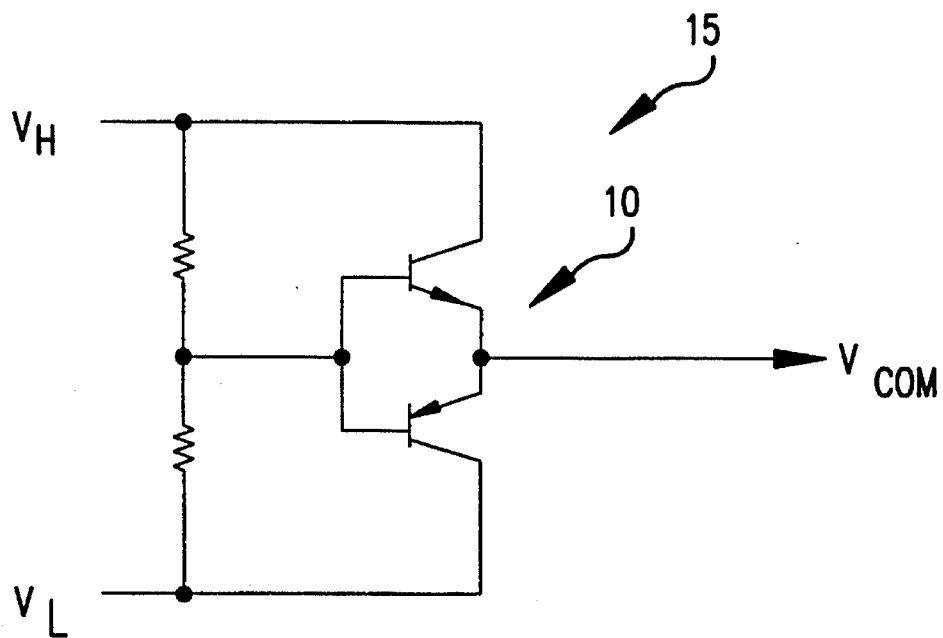
FIG. 7 is a circuit diagram of a conventional common electrode driving circuit using a DC voltage.
Figure 8:
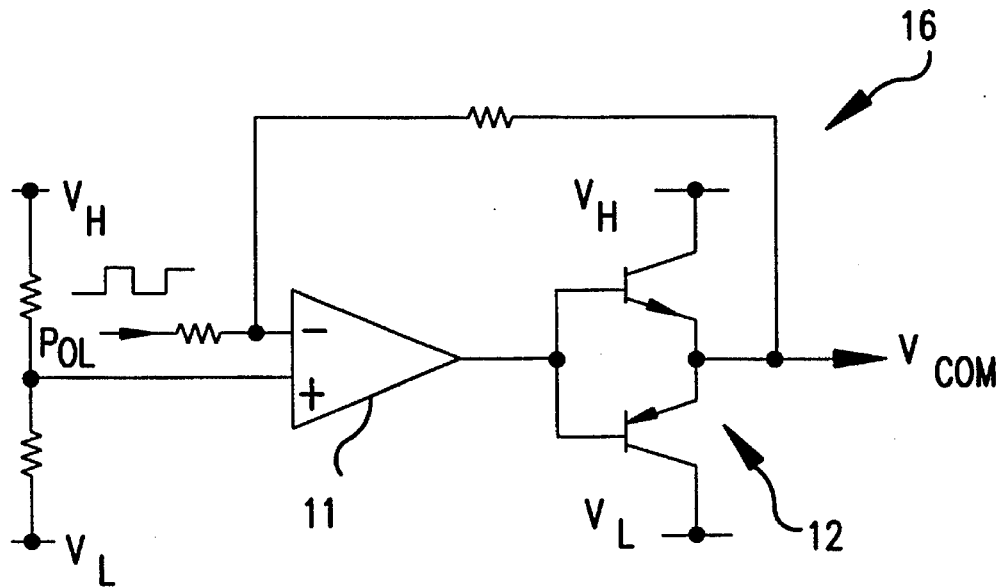
FIG. 8 is a circuit diagram of a conventional common electrode driving circuit using an AC voltage.
Figure 9A:
FIGS. 9(a) and 9(b) illustrate signal waveforms obtained by a conventional common electrode driving circuit using an AC voltage.
Figure 9B:
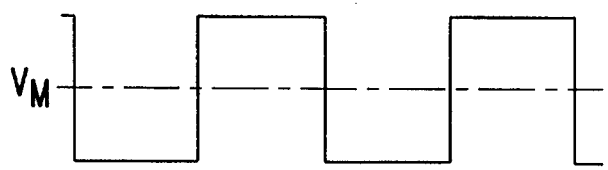
Figure 10A:
FIGS. 10(a) to 10(c) illustrate signal waveforms obtained by the conventional common electrode driving circuit shown in FIG. 7.
Figure 10B:
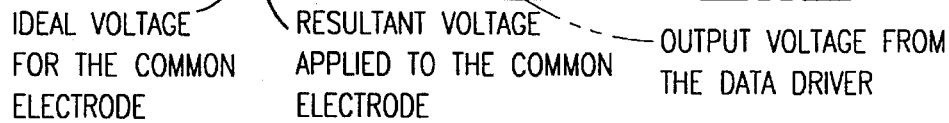
Figure 10C:
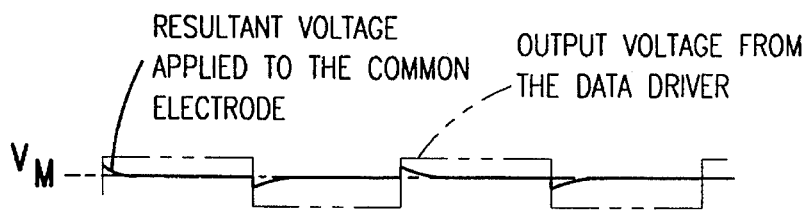
Figure 11A:
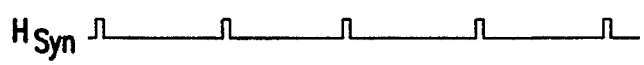
FIG. 11(a) to 11(d) illustrate signal waveforms obtained by the conventional common electrode driving circuit shown in FIG. 8.
Figure 11B:
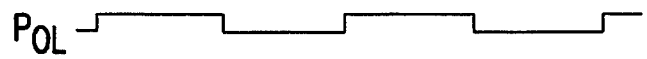
Figure 11C:
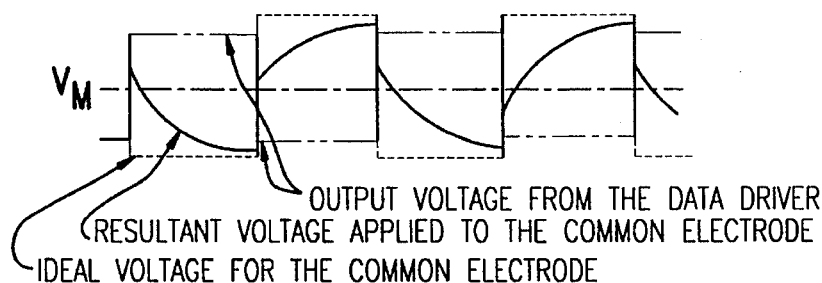
Figure 11D:
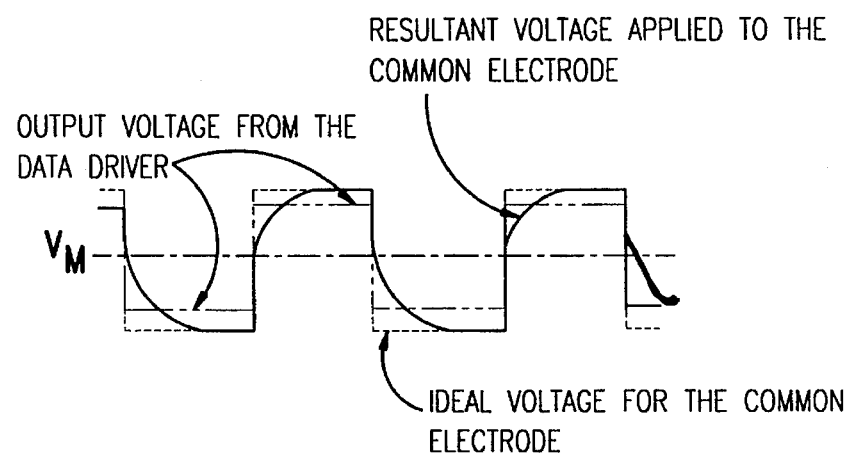
Figure 12:
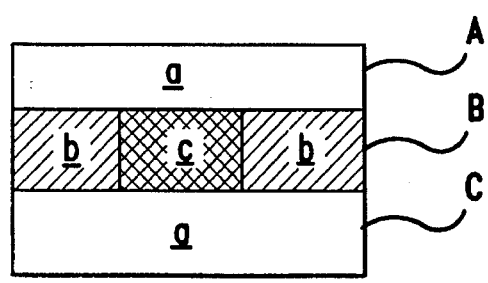
FIG. 12 is a view showing shadowing.

A common electrode driving circuit according to the present invention can be used for a display apparatus illustrated in FIG. 6.

An active matrix liquid crystal display apparatus generally includes a first substrate 1, a second substrate 2 opposed to the first substrate 1 and a liquid crystal layer (not shown) as a display medium interposed between the first substrate 1 and the second substrate 2. The first substrate 1 has a plurality of pixel electrodes, data lines, gate lines and the other elements (not shown) disposed on a surface thereof opposed to the second substrate 2. The second substrate 2 has at least one common electrode (not shown) on a surface thereof opposed to the first substrate 1. The common electrode is connected to common electrode driving terminals 4a and 4b provided on the first substrate 1 through common electrode transfer resistances 3a and 3b provided between the first and the second substrates 1 and 2. The common electrode is connected to the first substrate 1 in order to drive a common electrode using a common electrode driving circuit provided on the first substrate 1.

Figure 2:
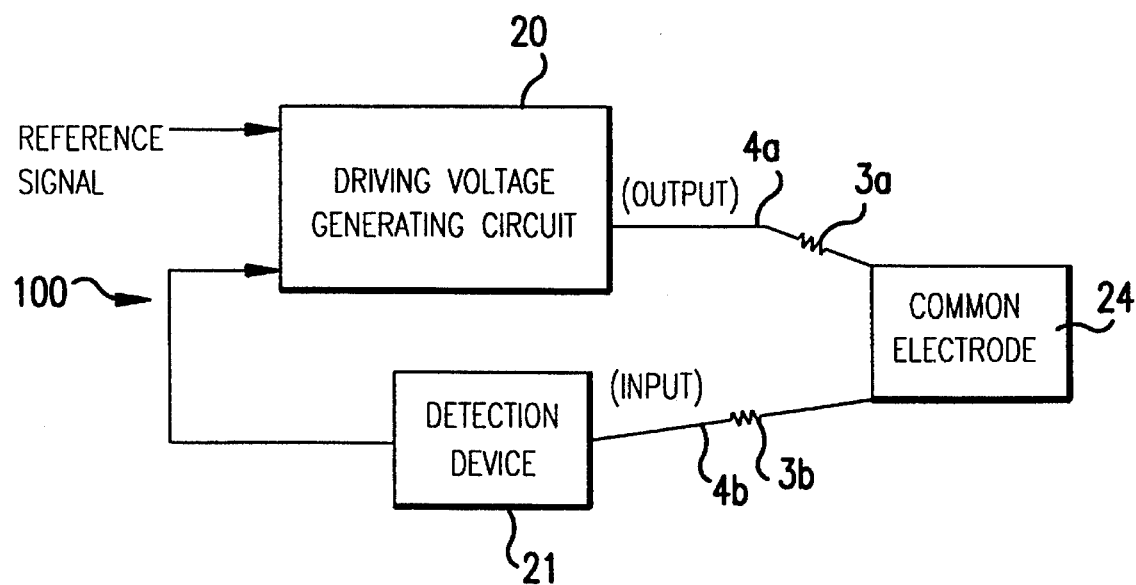
FIG. 2 is a block diagram of a common electrode driving circuit according to the present invention.

As is shown in FIG. 2, a common electrode driving circuit 100 includes a driving voltage generating circuit 20 for outputting a driving voltage to a common electrode 24 and a detection device 21 having a high input impedance element. The driving voltage generating circuit 20 generates a driving voltage based on a reference signal inputted thereto and outputs the driving voltage to the common electrode 24 through the common electrode driving terminal 4a and the common electrode transfer resistance 3a. The resultant voltage $V_{COM}$ applied to the common electrode 24 is inputted to the detection device 21 through the common electrode transfer resistance 3b and the common electrode driving terminal 4b, and then is fedback to the driving voltage generating circuit 20.

Even if the output voltage from the data driver has an influence to change the resultant voltage $V_{COM}$ applied to the common electrode 24, the driving voltage generating circuit 20 compensates for such a change based on a signal from the detection device 21, thus to maintain the resultant voltage $V_{COM}$ at a desirable level. Accordingly, the resultant voltage $V_{COM}$ applied to the common electrode 24 can be controlled to be at a specified level, regardless of the output voltage from the data driver. As a result, shadowing can be prevented.

A high input impedance element is used for the detection device 21 for the following reason:

The resultant voltage $V_{COM}$ applied to the common electrode 24 is sent to the common electrode driving terminal 4b through the common electrode transfer resistance 3b. The common electrode transfer resistance 3b is, in general, approximately 100 Ω. If a current flows through the common electrode transfer resistance 3b, the voltage applied to the common electrode driving terminal 4b has a different level from that of the resultant voltage $V_{COM}$ applied to the common electrode 24 by a voltage drop occurring at the common electrode transfer resistance 3b. The use of the high input impedance element for the detection device 21 reduces such a voltage drop to a negligible level, and thus enables the detection device 21 to detect the resultant voltage $V_{COM}$ applied to the common electrode 24 with high accuracy.

Further, in the common electrode driving circuit 100, the resultant voltage $V_{COM}$ applied to the common electrode 24 which is detected by the detection device 21 is fedback to the driving voltage generating circuit 20. Accordingly, the waveform of the resultant voltage $V_{COM}$ applied to the common electrode 24 coincides well with the ideal waveform of the reference signal. Accordingly, shadowing hardly occurs.

The common electrode driving circuit 100 may drive the common electrode 24 using a DC voltage or an AC voltage.

Figure 1:
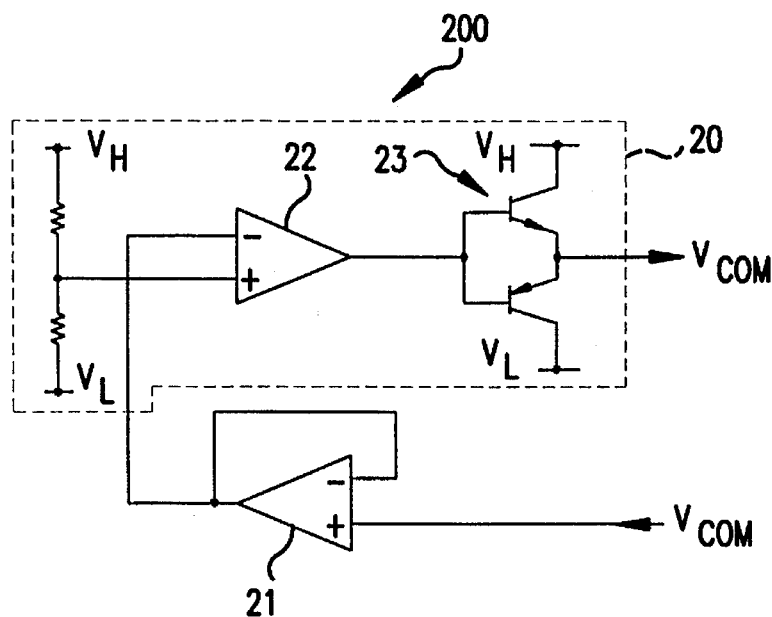
FIG. 1 is a circuit diagram of a common electrode driving circuit according to the present invention using a DC voltage.

FIG. 1 is a circuit diagram of a common electrode driving circuit 200, according to the present invention, using a DC voltage. The common electrode driving circuit 200 is provided with the driving voltage generating circuit 20 and the detection device 21 having a high input impedance operational amplifier. The driving voltage generating circuit 20 includes an operational amplifier 22, such as a voltage follower, for receiving two different voltages $V_H$ and $V_L$ ($V_H > V_L$) at a non-inversion input terminal thereof and a complementary circuit 23 for receiving a signal from the operational amplifier 22.

The driving voltage generating circuit 20 generates a DC voltage based on the two voltages $V_H$ and $V_L$, and sends the DC voltage to the common electrode 24. The resultant voltage $V_{COM}$ applied to the common electrode 24 is detected by the detection device 21 through the common electrode transfer resistance 3b (FIG. 2), and the detected voltage is applied to an inversion input terminal of the operational amplifier 22. Even if the output voltage from the data driver has an influence to change the resultant voltage $V_{COM}$ applied to the common electrode 24, the driving voltage generating circuit 20 compensates for such a change based on a signal from the detection device 21, thus to maintain the resultant voltage $V_{COM}$ at a desirable level. As a result, shadowing can be prevented.

Since the high input impedance operational amplifier is used for the detection device 21, a voltage drop occurring at the common electrode transfer resistance 3b is reduced to a negligible level. Thus, the detection device 21 detects the resultant voltage $V_{COM}$ applied to the common electrode 24 with high accuracy.

Further, in the common electrode driving circuit 200, the resultant voltage $V_{COM}$ applied to the common electrode 24 which is detected by the detection device 21 is fedback to the driving voltage generating circuit 20. Accordingly, the waveform of the resultant voltage $V_{COM}$ applied to the common electrode 24 coincides well with the ideal waveform of the reference signal as is shown in FIGS. 3(a) and 3(b).

FIGS. 3(a) and 3(b) illustrate signal waveforms obtained by the common electrode driving circuit 200 shown in FIG. 1. FIG. 3(a) illustrates a waveform of a horizontal synchronous signal; and FIG. 3(b) illustrates a waveform of a resultant voltage $V_{COM}$ applied to the common electrode 24 (indicated by the solid line) and a waveform of an output voltage from the data driver (indicated by the two-dot chain line). The one-dot chain line indicates the voltage of the reference signal. As is apparent from FIG. 3(b), the waveform of the resultant voltage $V_{COM}$ applied to the common electrode 24 is not influenced by the output voltage from the data driver and is extremely close to the ideal waveform of the reference signal as mentioned above. Accordingly, shadowing hardly occurs.

FIG. 4 is a circuit diagram of a common electrode driving circuit 300, according to the present invention, using an AC voltage. The common electrode driving circuit 300 is provided with the detection device 21 having a high input impedance analog buffer, a differential amplifier 31, resistances 32 and 33, and a complementary circuit 34. The differential amplifier 31 acts as a reference signal generating circuit and a driving voltage generating circuit.

The differential amplifier 31 receives a $P_{OL}$ signal as a reference signal at an inversion input terminal thereof through the resistance 32. The amplitude of the $P_{OL}$ signal changes from high level to low level alternately by one output period, which corresponds to one horizontal period. The differential amplifier 31 also receives a voltage $V_M$ which has the middle level between the voltages $V_H$ and $V_L$ ($V_H > V_L$) at a non-inversion input terminal thereof. An AC signal, having the voltage level $V_M$ as the central voltage level and an amplitude which is determined by the ratio of the resistance 32 with respect to the resistance 33, is generated. Such a signal is applied to the common electrode 24 as a driving voltage. The resultant voltage $V_{COM}$ applied to the common electrode 24 is detected by the detection device 21 through the common electrode transfer resistance 3b (FIG. 2), and then is fedback to the inversion input terminal of the differential amplifier 31 through the resistance 33. Even if the output voltage from the data driver has an influence to change the resultant voltage $V_{COM}$ applied to the common electrode 24, such a change is compensated for based on a signal from the detection device 21, and thus the resultant voltage $V_{COM}$ is maintained at a desirable level. As a result, shadowing can be prevented.

By the high input impedance analog buffer used for the detection device 21, a voltage drop occurring at the common electrode transfer resistance 3b can be reduced to a negligible level. Thus, the detection device 21 detects the resultant voltage $V_{COM}$ applied to the common electrode 24 with high accuracy.

Further, since the resultant voltage $V_{COM}$ detected by the detection device 21 is fedback to the inversion input terminal of the differential amplifier 31, the resultant voltage $V_{COM}$ applied to the common electrode 24 and the $P_{OL}$ signal coincide with each other in terms of phase and waveform. Practically, if the $P_{OL}$ signal has an ideal square waveform, the resultant voltage $V_{COM}$ applied to the common electrode 24 also has a substantially square waveform as is shown in FIG. 5.

Figure 5:
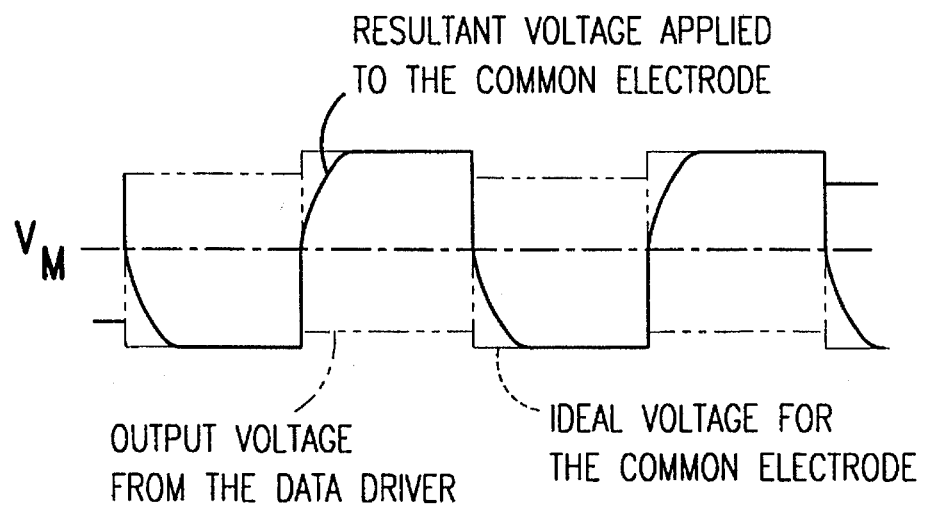
FIG. 5 is a view illustrating signal waveforms obtained by the common electrode driving circuit shown in FIG. 4.

FIG. 5 illustrates signal waveforms obtained by the common electrode driving circuit 300 shown in FIG. 4. The solid line indicates a resultant voltage $V_{COM}$ applied to the common electrode 24; the two-dot chain line indicates an output voltage from the data driver; the one-dot chain line indicates the central voltage $V_M$; and the dashed line indicates an ideal waveform for the voltage applied to the common electrode 24. As is apparent from FIG. 5, the resultant voltage $V_{COM}$ applied to the common electrode 24 is not influenced by the output voltage from the data driver and is extremely close to the ideal waveform. As a result, shadowing hardly occurs.

In the above examples, a high input impedance differential amplifier and a high impedance analog buffer are used for the detection device. Other high impedance elements may also be used for the detection device.

A common electrode driving circuit according to the present invention may be used in the case where one common electrode is provided for a plurality of pixel electrodes in a smaller number than the number of pixel electrodes arranged in one line of a matrix of pixel electrodes, or in the case where one common electrode is provided for a plurality of pixel electrodes arranged in one line or a plurality of pixel electrodes arranged in a plurality of lines.

A common electrode driving circuit according to the present invention may be used in various types of display apparatuses in addition to a liquid crystal display apparatus.

A common electrode driving circuit according to the present invention may be used in an apparatus using thin film transistors or other switching devices.

As has been described, a common electrode driving circuit according to the present invention prevents shadowing in any type of images. Shadowing, which easily occurs especially in large, highly precise images, can be prevented, and thus high quality, large-size, precise images with no shadowing can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A common electrode driving circuit for use in a display apparatus including a first substrate; a second substrate opposed to the first substrate; a display medium interposed between the first substrate and the second substrate; a plurality of pixel electrodes, a plurality of common electrode driving terminals provided on a surface of the first substrate opposed to the second substrate; and at least one common electrode provided on a surface of the second substrate opposed to the first substrate, the common electrode being opposed to the plurality of pixel electrodes and being connected to the plurality of common electrode driving terminals respectively through a plurality of common electrode transfer resistances, the common electrode driving circuit comprising:

detection means for detecting a resultant voltage applied to the common electrode through at least one of the plurality of common electrode transfer resistances and including a high impedance element; and driving voltage generating means for generating a driving voltage based on a reference signal and the resultant voltage applied to the common electrode which is detected by the detection means and outputting the driving voltage to the common electrode through at least one of the plurality of common electrode transfer resistances Which is not connected to the detecting means.

2. A common electrode driving circuit according to claim 1, wherein the driving voltage is a DC voltage.

3. A common electrode driving circuit according to claim 1, wherein the driving voltage is an AC voltage.

4. A common electrode driving circuit for use in an AC driving display apparatus including a first substrate; a second substrate opposed to the first substrate; a display medium interposed between the first substrate and the second substrate;

a plurality of pixel electrodes, a plurality of common electrode driving terminals provided on a surface of the first substrate opposed to the second substrate; and at least one common electrode provided on a surface of the second substrate opposed to the first substrate, the common electrode being opposed to the plurality of pixel electrodes and being connected to the plurality of common electrode driving terminals respectively through a plurality of common electrode transfer resistances, the common electrode driving circuit comprising:

detection means for detecting a resultant voltage applied to the common electrode through at least one of the plurality of common electrode transfer resistances and including a high impedance element; and driving voltage generating means for generating an AC driving voltage based on a reference signal and the resultant voltage applied to the common electrode which is detected by the detection means and outputting the AC driving voltage to the common electrode through at least one of the plurality of common electrode transfer resistances which is not connected to the detecting means, wherein the reference signal and the resultant voltage coincide with each other in phase and waveform.

\* \* \* \* \*